United States Patent [19]

Luciani

[11] Patent Number: 4,827,367

[45] Date of Patent: May 2, 1989

[54] FOGLIGHT HAVING A TRANSVERSE FILAMENT FOR A MOTOR VEHICLE

[75] Inventor: Bernard Luciani, Paris, France

[73] Assignee: Cibie Projecteurs, Bobigny, France

[21] Appl. No.: 80,624

[22] Filed: Jul. 31, 1987

[30] Foreign Application Priority Data

Aug. 4, 1986 [FR] France ................................ 86 11263

[51] Int. Cl.⁴ ................................................ B60Q 1/00

[52] U.S. Cl. ...................................... 362/61; 362/299; 362/80

[58] Field of Search ................. 362/61, 307, 351, 317, 362/80, 309

[56] References Cited

U.S. PATENT DOCUMENTS 4,246,631 1/1981 Draper et al. .................. 362/299 X
4,303,965 12/1981 Vile et al. ............................ 362/61
4,520,433 5/1985 Kosmatka ............................ 362/80
4,685,036 8/1987 Loewe et al. ......................... 362/61
4,686,610 8/1987 Cibiéet al. ............................ 362/61

FOREIGN PATENT DOCUMENTS 1309130 1/1962 France .
1319105 4/1962 France .
2536503 5/1984 France .

*Primary Examiner*—Larry Jones

[57] ABSTRACT

A motor vehicle foglight of the type comprising: a lamp having a transverse horizontal filament (10); a reflector (20) whose axis (Ox) passes in the same vertical plane as the center of the filament ($F_O$); and a closure glass (30). According to the invention the surface of the reflector is a surface without discontinuity forming images of the filament in which all the points of the images are situated below a horizontal cutoff and in a horizontal strip of substantially constant height situated beneath said cutoff. The invention is applicable to foglights which do not include a masking cup.

6 Claims, 4 Drawing Sheets

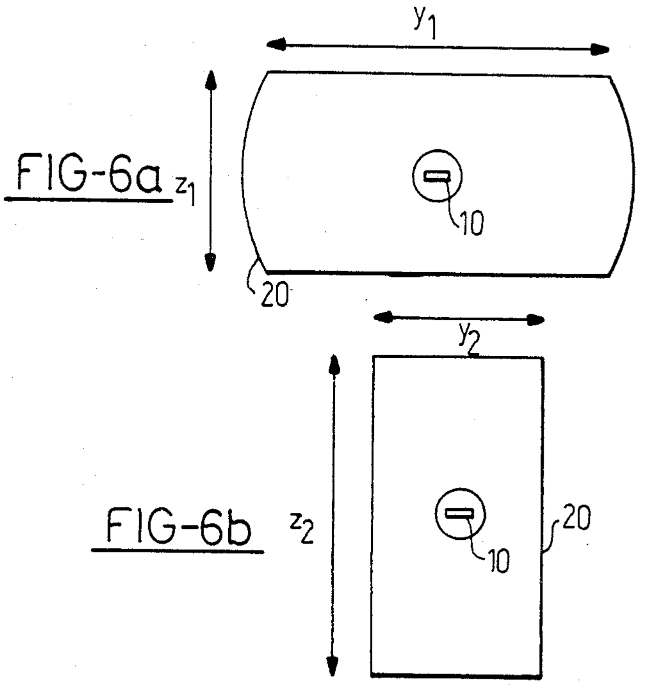
FIG-6a
FIG-6b
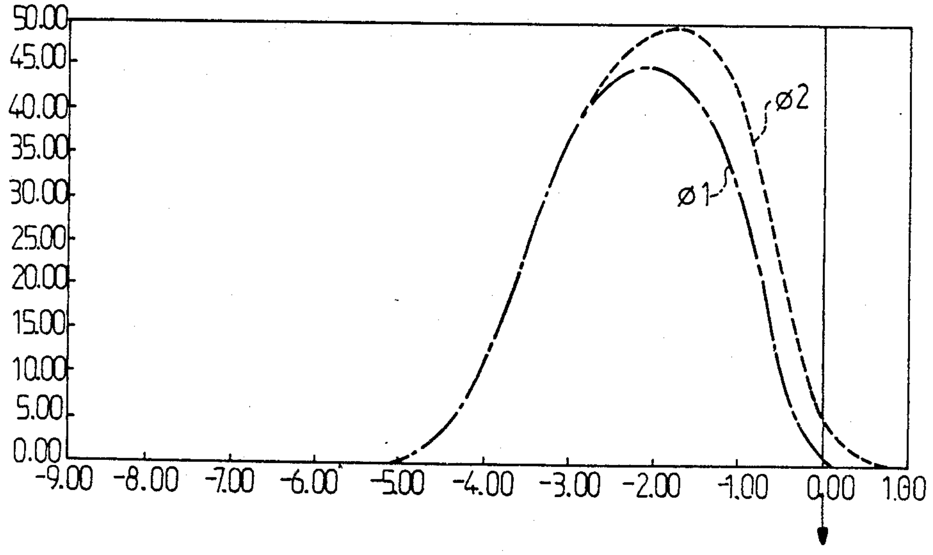
FIG-7

FOGLIGHT HAVING A TRANSVERSE FILAMENT FOR A MOTOR VEHICLE

The present invention relates to a motor vehicle light suitable for providing illumination in fog.

BACKGROUND OF THE INVENTION

The beam corresponding to such illumination is a short range beam which is limited in the upwards direction by a substantially horizontal cutoff plane, which is spread very wide in the sideways direction, and which does not include any rising rays which could give rise to undesirable optical phenomena in conjunction with the droplets of water in suspension in a fog.

Prior art foglights generally include an axially oriented filament, i.e. a filament lying on the axis of the foglight.

Several solutions have been proposed for the associated reflector. The first solution consists in providing a reflector in the form of a paraboloid of revolution whose focus is situated at the front end of the filament (in the light emission direction). This provides a slightly divergent beam and the rays in its top half are deflected downwardly by deflector elements provided in the closure glass.

However, this gives rise to considerable excess thickness in the glass which makes it difficult to mold, particularly when the glass is literally made of glass.

Proposals have also been made to form a reflector using two axially offset half-paraboloids. The top half-paraboloid is focused on the rear end of the filaments so as to form a conventional cutoff beam while the bottom half-paraboloid is focused on the front end of the filament so that all the images of the filament are situated beneath the cutoff.

Such a foglight suffers from two major drawbacks. Firstly the reflector has a surface discontinuity where the two half-parabolids meet: since the paraboloids are focused on different points, they necessarily have different apexes, or else they have different focal lengths, and in either case they have different profiles along a connection plane; as a result of this, a reflector manufactured in accordance with this teaching is never perfect, in practice, at the connection, thereby giving rise to parasitic light rays being emitted above the cutoff.

Secondly, and above all, the beam generated by the bottom half-paraboloid is spread out sideways in a satisfactory manner only in a zone situated immediately below the cutoff. This non-uniform spread of the beam goes against the desired aim of a fog lamp beam which is to obtain relatively uniform sideways spread.

Finally, proposals have been made in French published patent application No. 2 536 503 in the name of the Applicant, for a foglight in which the filament remains axially oriented and the reflector comprises a composite surface without discontinuity suitable for forming images of the filament in which nearly all the points of the images are situated beneath the cutoff. Such a solution makes it possible to obtain a completely uniform sideways spread of the beam together with a well-defined cutoff.

However, using an axial filament with a reflector of this type necessary gives rise to filament images which are large in size and which are vertically oriented or at a small angle to the vertical. Such images need spreading sideways by a considerable amount, and to do this it is necessary to provide appropriate prisms or ribs on the closure glass. A second drawback of this type of fog lamp, likewise due to the existence of such vertical images, is that the beam is thicker than required in practice, with the bottom portion of the beam not contributing to useful illumination and possibly even constituting a hinderance by illuminating the road too close to the vehicle.

Finally, prior art foglights exist which include a lamp having a horizontal filament extending across the foglight axis, and associated with a reflector in the form of a paraboloid of revolution whose focus is situated at the center of the filament. In this way, the beam does not include large filament images, however it remains necessary to deflect the images in a vertical direction using prisms formed in the closure glass and with the consequent risk of emitting parasitic rays in an upwards direction from the edges of the prisms.

The present invention seeks to mitigate the drawbacks of the prior art and to provide a foglight in which the closure glass needs to provide substantially no vertical deflection of the light rays, and in which the beam obtained is properly uniform in width as well as in height.

SUMMARY OF THE INVENTION

To this end the invention provides a motor vehicle foglight of the type comprising: a lamp having a transverse horizontal filament; a reflector whose axis passes in the same vertical plane as the center of the filament; and a closure glass; the foglight including the improvement whereby the surface of the reflector is a surface without discontinuity forming images of the filament in which all the points of the images are situated below a horizontal cutoff and in a horizontal strip of substantially constant height situated beneath said cutoff.

BRIEF DESCRIPTION OF THE DRAWINGS

The invention will be better understood from reading the following detailed description of preferred embodiments thereof, given by way of example and with reference to the accompanying drawings, in which:

FIGS. 6*a* and 6*b* are front views of two first variant embodiments of a foglight in accordance with the invention;

FIG. 7 is a plot of light flux as a function of inclination characteristic of the variants shown in FIGS. 6*a* and 6*b*;

DESCRIPTION OF PREFERRED EMBODIMENTS

Figure 1:
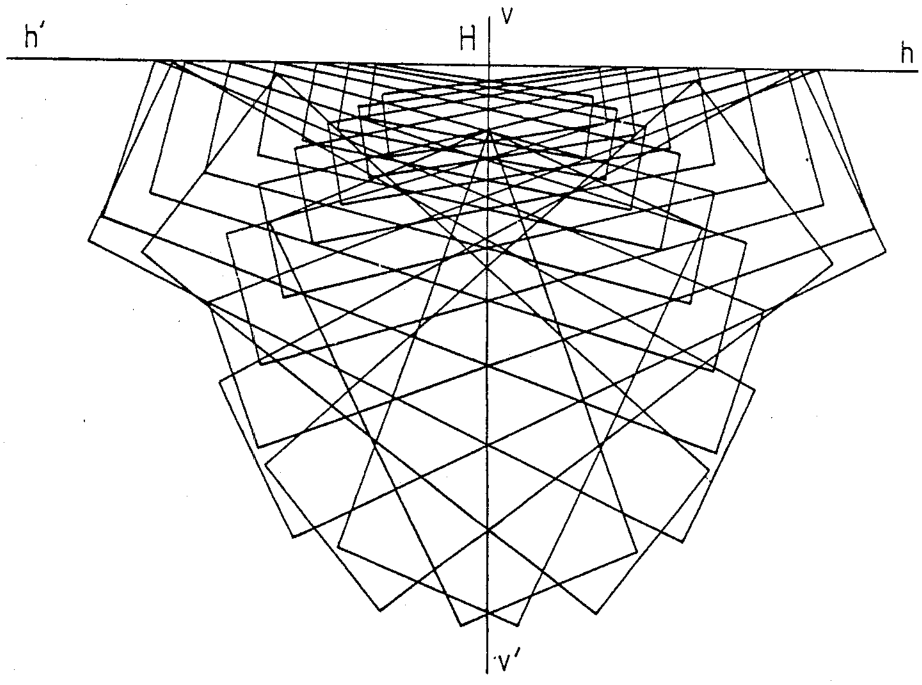
FIG. 1 shows the filament images as projected onto a standardized screen by a printer art foglight having an axial filament.

FIG. 1 shows the images of the filament as projected onto a projection screen by the reflector of a foglight in accordance with French published patent application No. 2 536 503 in the name of the Applicant. As mentioned above, there are several large images which are oriented in directions that are close to the vertical. These images give rise to excessive beam thickness in the middle of the beam, thereby hindering the driver's view by illuminting the road too close to the vehicle, and thus requiring means on the closure glass for providing a relatively high degree of sideways spreading.

Figure 2:
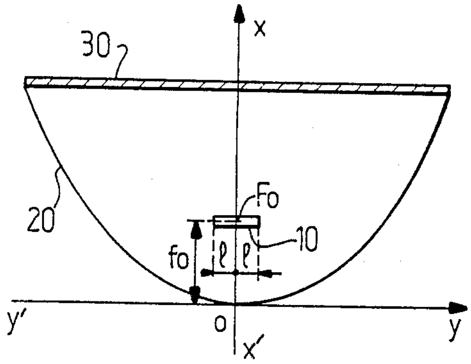
FIG. 2 is a diagrammatic horizontal section view through a basic embodiment of a foglight in accordance with the invention.
Figure 3:
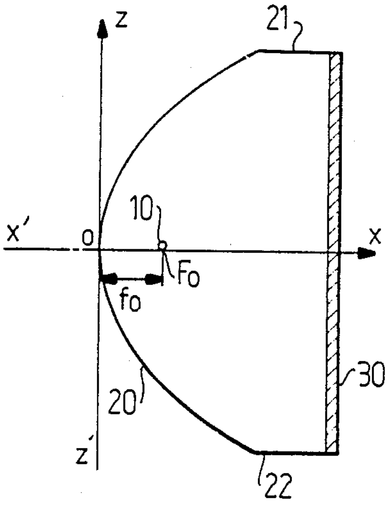
FIG. 3 is a longitudinal vertical section through the FIG. 2 foglight.

The foglight in accordance with the invention as shown diagrammatically in FIGS. 2 and 3 comprises a lamp (not shown) having a filament 10, a reflector 20, and a spreading glass 30 which closes the foglight.

The filament is disposed in a horizontal plane and is oriented transversely to the axis Ox of the reflector. More precisely, in the present example, the filament which is assumed to be a cylinder of length 2l and of radius r, is offset upwardly from the horizontal plane xOy by a distance equal to its radius, such that its light-emitting surface is tangential to said plane. In addition, the filament is disposed in the direction y'Oy so that its center is vertically above a point $F_0$ lying on the axis Ox. The distance of the apex of the reflector from the point $F_0$ is marked $f_0$. Naturally, the position of the filament could vary a little relative to the above-mentioned position without thereby going beyond the scope of the invention.

The surface of the reflector is a surface without discontinuity, designed to form images of the filament in which all the points of the images are situated beneath a horizontal cutoff passing through the axis of the foglight (referenced h'Hh in FIGS. 4*a*, 4*b* and 5), and lie in a horizontal strip of substantially constant height which is delimited along the top by said cutoff.

Advantageously, all of these images have their highest points situated on the cutoff or very close thereto.

The term "absence of discontinuity" is used to mean that first order continuity is sensured at all points on the surface of the reflector, and that second order continuity is ensured at all points of the surface except for two localized defects which, as explained below, appear in the form of very small kinks in curvature. It is recalled that second order continuity means that the tangential planes at any point of a line drawn on the surface are of the same on both sides of the line.

In practice, such a disposition makes it possible to make real surfaces by stamping or by injection molding which are very close to the theoretical design surfaces, thereby avoiding the defects specific to the above-described system having two offset half-paraboloids.

Theoretical calculation shows that the surface defined by the following equation in an orthogonal frame of reference (O,x,y,z) as shown in FIGS. 2 and 3 has the specified properties:

$$x=y^2/4f_0+z^2/4f_0Q \qquad (1)$$

where:

$$Q = 1 - \frac{4f_0r(z/|z|) + 2yl(yz/|yz|)}{4f_0^2 + y^2}$$

and:

r is the radius of the filament;

l is the half-length of the filament; and $f_0$ is the distance between the center of the filament and the plane yOz (i.e. the X co-ordinate of the point $F_0$).

Further, if the radius r is assumed to be very small, the above equation becomes, to a first approximation:

$$x=y^2/4f_0+z^2/4f_0S \qquad (2)$$

where:

$$S = 1 - \frac{2yl(yz/|yz|)}{4f_0^2 + y^2}$$

and also has the specified properties, although the quality of the result obtained is slightly less good.

These surfaces intersect the plane xOy with a parabola of focal length $F_0$, and define complex surfaces which act on the images of the filament in a manner described in greater detail below.

Also, it can be shown that the surfaces defined mathematically above are second order continuous except for two localized defects in the vertical plane xOz, where continuity is assured only to the first order. Thus, a very slight kink is to be found in these regions, but in practice the kink is eliminated during the polishing stages that are conventionally included in the reflector manufacturing process. Further, these localized defects give rise to substantially no anomalies in the beam obtained.

Figure 4A:
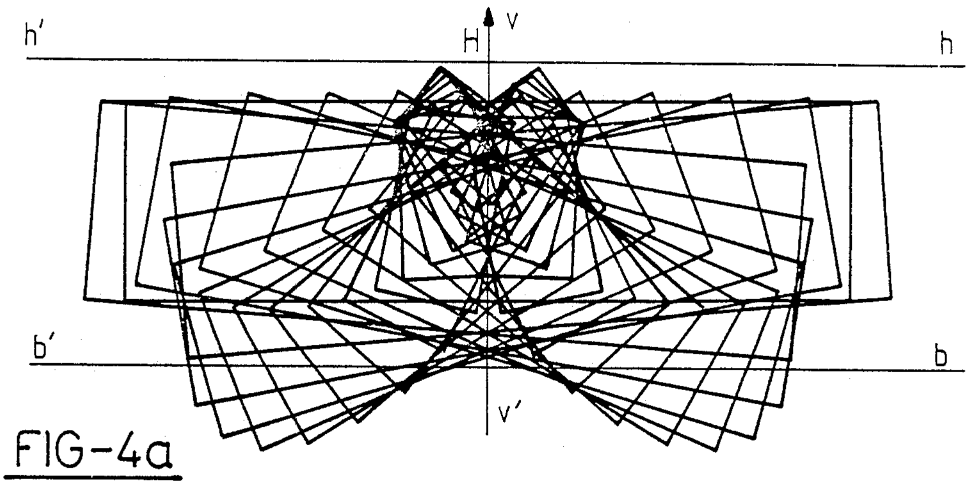
FIGS. 4*a* and 4*b* show the images of the filament as projected by two specific zones of the foglight shown in FIGS. 2 and 3.
Figure 4B:
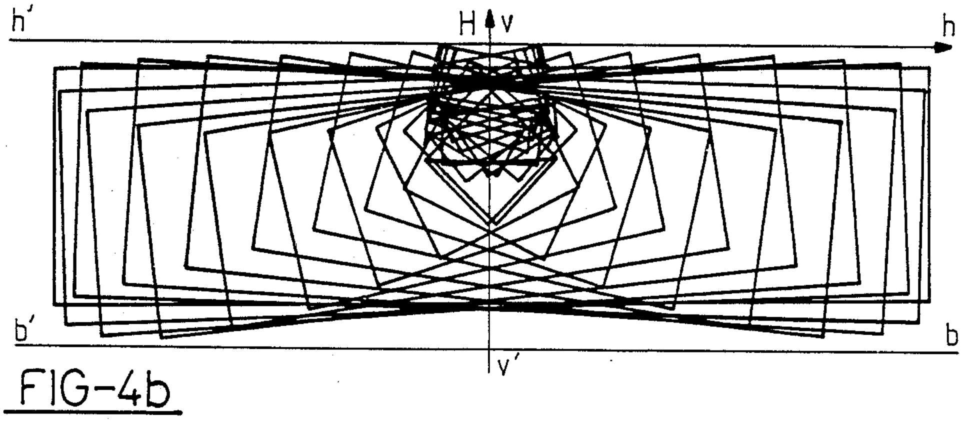

FIGS. 4*a* and 4*b* show the images of the filament as projected onto a standardized screen at 25 meters (m) from the foglight by reflection at points situated on a common horizontal plane of the reflector, respectively at positions z=−40 mm (FIG. 4*a*) and z=−20 mm (FIG. 4*b*). These two figures should be compared with FIG. 1 which shows the image distribution applicable to a foglight having a composite surface without discontinuity and associated with an axial filament. Unlike the FIG. 1 situation, the distribution of images beneath the cutoff, and in particular in a horizontal direction, is much more uniform in this case, and more precisely it can be seen that the lengths of the filament images shorten progressively as the images rotate about their centers from the horizontal towards the vertical. Thus, not only is the highest point of each image situated very close to the cutoff h'Hh, but also the lowest points of these images project very little beyond a bottom cutoff referenced b'b in FIGS. 4*a*, 4*b*, and 5, thereby obtaining a beam whose thickness is approximately constant over a considerable width. This avoids, in particular, illuminating the road too close to the vehicle, as occurs with the large vertical images shown in FIG. 1, and which should be avoided in practice.

Figure 5:
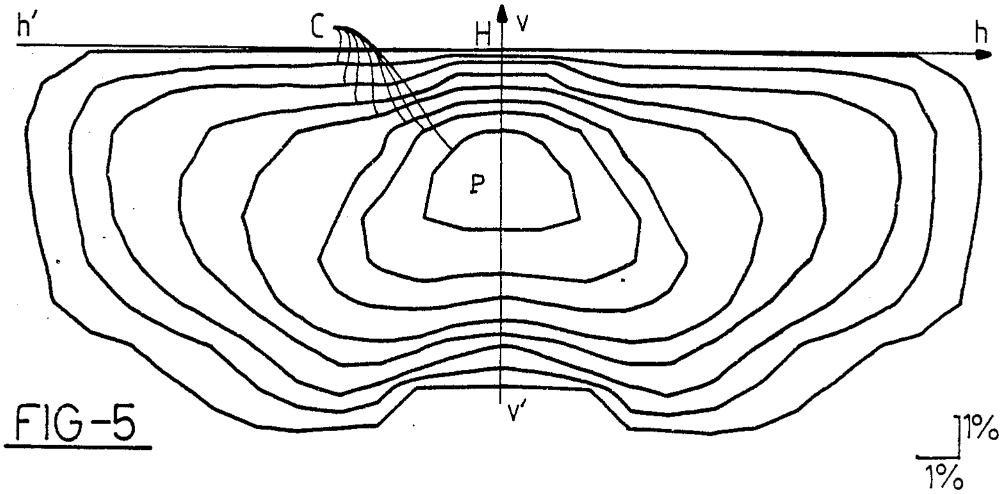
FIG. 5 is a plot of a series of isocandela curves whose values decrease going outwardly from the center, said curves representing the illumination provided by the foglight of FIGS. 2 and 3.
Figure 8A:
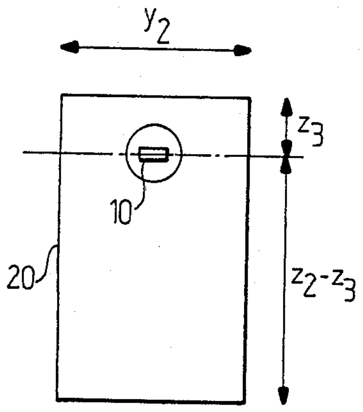
FIGS. 8*a* and 8*b* are front views of two other variant embodiments of a foglight in accordance with the invention.
Figure 8B:
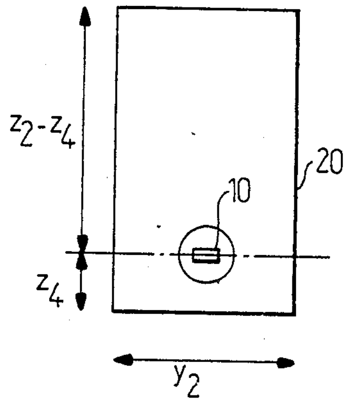

FIG. 5 is a plot of isocandela curves C of decreasing value when going outwardly from the middle, showing the illumination provided by the reflector as a whole, and it can be seen that the top horizontal cutoff h'Hh is sharp, that the beam is very wide and of practically constant thickness, and the concentration point P is situated beneath the cutoff h'Hh and is centered on the vertical v'Hv.

The closure glass may optionally provide additional sideways spreading of the beam. However, such spreading is obtained by the very nature of the reflector and there is no need to provide large excess thicknesses in the closure glass: the closure glass is thus easy to mold and may be made of plastic material or of the glass per se.

Further, when the reflector is truncated top and bottom by a pair of horizontal plane cheeks 21 and 22 (see FIG. 3), it may be advantageous to ensure that the cheeks are non-reflecting so as to avoid a considerable quantity of light from being diffused above the cutoff.

The reflector may be designed in various different shapes. Thus, FIG. *6a* is a diagrammatic front view of a foglight without its closure glass, and foglight having a reflector whose width $y_1$ is approximately twice its height $z_1$. In FIG. *6b*, these proportions are interchanged, with the height $z_2$ being approximately twice the width $y_2$. These values are determined so that the total effective areas of the two reflectors are approximately identical. The influence of the shape of the reflector outline on the characteristics of the beam obtained can be determined. In particular, the light flux (in lumens) has been measured for both of these foglights in a longitudinal vertical plane xOz as a function of the inclination (in degrees) below the cutoff. FIG. 7 shows two curves $\phi_1$ and $\phi_2$ obtained using the foglights of FIGS. *6a* and *6b*, respectively.

As can be seen, the FIG. *6b* foglight gives more light flux between about 0° and about 2° beneath the cutoff, such that the yield un this region is slightly increased. In contrast, this configuration gives rise to residual light flux of very low value above the cutoff, and in practice the residual light flux will not hinder the driver's view.

With the FIG. *6b*, reflector shape, tests have also been performed to see if varying the position of the filament in a vertical direction relative to said shape (and not relative to the surface of the reflector which is always determined relative to the position of the filament) would lead to modifications in the illumination characteristics of the beam. FIG. *8a* shows the filament situated at a distance $z_3$ beneath the top edge of the reflector, which distance is about one-tenth of the total height $z_2$ of the reflector, and FIG. *8b* shows the filament at a distance $z_4$ which is substantially equal to $z_3$ above the bottom edge of the reflector. Here again the areas of the two reflectors are equal.

Figure 9:
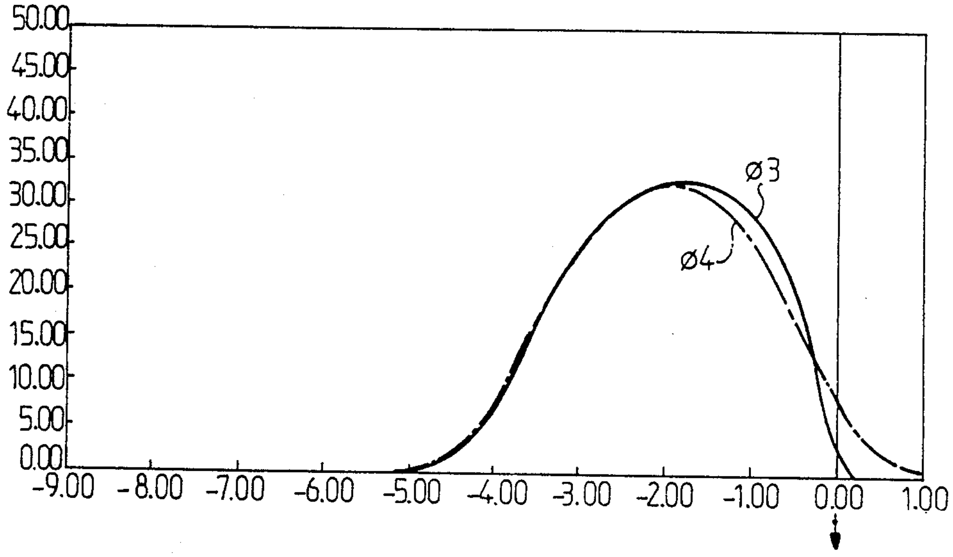
FIG. 9 is a plot of light flux as a function of inclination specific to the variants of FIGS. 8*a* and 8*b*.

The variations in light flux (in lumens) as a function of inclination (in degrees) relative to the cutoff for these two foglights are shown by curves $\phi_3$ and $\phi_4$ in FIG. 9. As can be seen, when the lamp is upwardly offset, not only is there more light flux between about 0.4° and 2° beneath the horizontal, but also the cutoff at the horizontal is much sharper, which cutoff is illustrated by the steep slope of the curve.

Thus, although the invention may be implemented with any reflector outline and with any relative disposition of the filament with respect to a given reflector outline, it is advantageous to increase the height of the foglight as much as possible (to the detriment of its width) and to offset the lamp upwardly therein.

Naturally, the present invention is not limited to the various embodiments described above, and the person skilled in the art can readily make any variation or modification thereto without going beyond the scope of the invention.

I claim:

1. A motor vehicle foglight of the type comprising: a lamp having a transverse horizontal filament; a reflector whose axis passes in a vertical plane including the center of the filament; and a closure glass; the foglight including the improvements whereby:

The filament is upwardly offset by a distance such that its surface is substantially tangential to the horizontal plane including the axis of the reflector;

The surface of the reflector is without discontinuity and approximately defined by the equation:

$$x=y^2/4f_0+z^2/4f_0Q \qquad (1)$$

where:

$$Q = 1 - \frac{4f_0r(z/|z|) + 2yl(yz/|yz|)}{4f_0^2 + y^2}$$

and x, y, z=cartesian coordinates with the axis Ox being the axis of the foglight and Oz being vertical;

r=the radius of the filament;

l=the half-length of the filament; and fo=the distance between the axis of the filament and the plane yOz, Whereby the reflector forms images of the filament all having their highest points in the vicinity of a horizontal cutoff and all the points of which are situated in a horizontal strip of essentially constant height situated beneath said cutoff.

2. A foglight according to claim 1, wherein the lamp is offset upwardly relative to the center of the foglight.

3. A foglight according to claim 1, in which the reflector is truncated along at least two of its four sides by plane cheeks, and wherein the surfaces of the cheeks are non-reflecting surfaces.

4. A motor vehicle foglight of the type comprising: a lamp having a transverse horizontal filament; a reflector whose axis passes in a vertical plane including the center of the filament; and a closure glass; the foglight including the improvements whereby:

The filament is upwardly offset by a distance 4 such that its surface is substantially tangential to the horizontal plane including the axis of the reflector;

The surface of the reflector is without discontinuity and approximately defined by the equation:

$$x=y^2/4f_0+z^2/4f_0S \qquad (2)$$

where:

$$S = 1 - \frac{2yl(yz/|yz|)}{4f_0^2 + y^2}$$

and x, y, z=cartesian coordinates with the axis Ox being the axis of the foglight and Oz being vertical;

l=the half-length of the filament; and $f_o$=the distance between the axis of the filament and the plane yOz, Whereby the reflector forms images of the filaments all having their highest points in the vicinity of a horizontal cutoff and all the points in the vicinity of a horizontal cutoff and all the points of which are situated in a horizontal strip of essentially constant height situated beneath said cutoff.

5. A foglight according to claim 4, wherein the lamp is offset upwardly relative to the center of the foglight.

6. A foglight according to claim 4, in which the reflector is truncated along at least two of its four sides by plane cheeks, and wherein the surfaces of the cheeks are non-reflecting surfaces.

* * * * *